United States Patent [19]

Taylor

[11] Patent Number: 4,993,070
[45] Date of Patent: Feb. 12, 1991

[54] CIPHERTEXT TO PLAINTEXT COMMUNICATIONS SYSTEM AND METHOD

[75] Inventor: Steven C. Taylor, Hillsborough, Calif.

[73] Assignee: Verilink Corporation, San Jose, Calif.

[21] Appl. No.: 437,876

[22] Filed: Nov. 16, 1989

[51] Int. Cl.$^5$ .............................................. H04L 9/02
[52] U.S. Cl. ........................................ 380/48; 380/49
[58] Field of Search ................................ 380/2, 48, 49

[56] References Cited

U.S. PATENT DOCUMENTS 3,868,631 2/1975 Morgan et al. .......................... 380/2

Primary Examiner—Stephen C. Buczinski
Attorney, Agent, or Firm—David B. Newman, Jr.

[57] ABSTRACT

A ciphertext to plaintext communications system including a communications channel, a generator, a data device, an encryptor, a black to red communicator (BRC) device, a decryptor, and a comparator. The generator generates a first data-bit sequence which has a predetermined bit pattern. The encryptor encrypts the first data-bit sequence as an encrypted-bit sequence. The encrypted-bit sequence is transmitted over the communications channel and received by the BRC device. The data device generates the second data-bit sequence, which may include data from diagnostic equipment or any other source of information originating in the channel carrying the encrypted-bit sequence. The BRC device modifies the encrypted-bit sequence using the second data-bit sequence. The decryptor decrypts the modified-encrypted-bit sequence as a third data-bit sequence. The third data-bit sequence is compared with the predetermined bit pattern with the comparator, which thereby generates the second data-bit sequence.

31 Claims, 2 Drawing Sheets

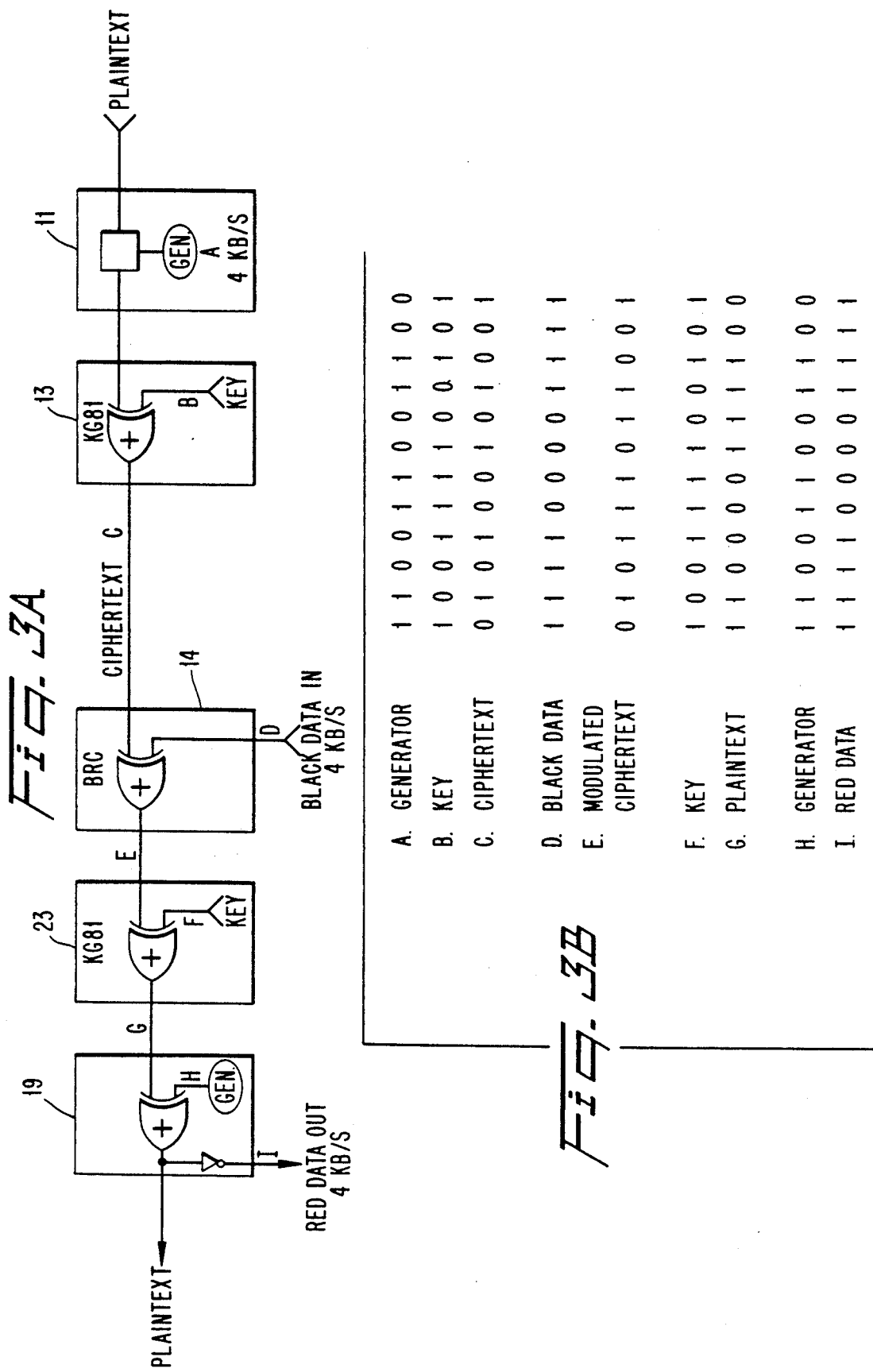

CIPHERTEXT TO PLAINTEXT COMMUNICATIONS SYSTEM AND METHOD

BACKGROUND OF THE INVENTION

This invention relates to encrypted communications, and more particularly to a method and apparatus for communicating from an encrypted communications channel through a decryptor to a plaintext channel.

DESCRIPTION OF THE PRIOR ART

Computer communications networks make extensive use of publicly available network systems such as the T1 network. Much of the information stored in computers, and transmitted over the various communications networks that connect them, represents valued property that is vulnerable to unauthorized access and disclosure, fraudulent manipulation, and disruption. Also, the expanding scope of networks for data communications includes important functions such as electronic funds transfer, stock transfers, valuable corporate data transfers, and the use of networks for personal and sensitive data communications. These functions have caused the increased need for encrypted communications.

A problem with encrypted communications is that there are needs for having to communicate data from sensors and other equipment on the ciphertext channel to personnel or computers on the plaintext channel. Due to security requirements that equipment not bypass or send data around an encryptor or decryptor from a ciphertext channel to a plaintext channel, two computers are commonly employed for data management: a first computer in the ciphertext channel and a second computer in the plaintext channel.

At present, means do not exist for communicating from the ciphertext channel to the plaintext channel, data which may originate in the ciphertext channel. Thus, diagnostic information which may originate from the ciphertext channel cannot be passed to the plaintext channel, but instead are processed with a separate computer connected to the ciphertext channel.

OBJECTS AND SUMMARY OF THE INVENTION

An object of the invention is to provide a method and apparatus for communicating information from a ciphertext channel to a plaintext channel without having to bypass an encryption or decryption device.

Another object of the invention is to provide a method and apparatus for communicating from a ciphertext channel to a plaintext channel which will allow processing of information from the ciphertext by processors in the plaintext channel.

A further object of the invention is to provide a method and apparatus for communicating from a ciphertext channel to a plaintext channel that is simple and easy to use and does not require complex equipment.

According to the present invention, as embodied and broadly described herein, a ciphertext to plaintext communications system is provided comprising a communications channel, first generating means, encoding means, data generating means, modifying means, decoding means, and comparing means. The first generating means may be embodied as a generator. The encoding means may be embodied as an encryptor, the data generating means may be embodied as a data device, the modifying means may be embodied as a black to red communicator (BRC) device, the decoding means may be embodied as a decryptor, and the comparing means may be embodied as a comparator.

The encoding means is coupled to the first generating means and the communications channel. The modifying means is coupled to the communications channel and data generating means. The decoding means is coupled to the modifying means, and the comparing means is coupled to the decoding means.

The first generating means generates a first data-bit sequence which has a predetermined bit pattern. The predetermined bit pattern may be, for example, a series of all 1-bits. The encoding means encodes the first data-bit sequence as an encoded-bit sequence. The encoded-bit sequence is transmitted over the communications channel and received by modifying means. The data generating means generates the second data-bit sequence, which may include data from diagnostic equipment or any other source of information originating in the channel carrying the encoded-bit sequence. The modifying means is coupled to the data generating means and to the encoding means, and modifies the encoded-bit sequence using the second data-bit sequence. This modifying may be done, for example, using an exclusive OR circuit. The decoding means decodes the modified-encoded-bit sequence as a third data-bit sequence. The third data-bit sequence is compared with the predetermined bit pattern by comparing means, which thereby generates the second data-bit sequence. The predetermined bit pattern is known at the comparing means and is identical to that used by the first generating means with the first data-bit sequence. Accordingly, the second data-bit sequence is produced at the output to the comparing means.

The present invention also includes a method for using a ciphertext to a plaintext communications system. The method comprises the steps of generating a first data-bit sequence having a predetermined data-bit pattern; encoding the first data-bit sequence as an encoded-bit sequence and transmitting the encoded-bit sequence over the communications channel; and generating a second data-bit sequence comprising a plurality of first and second bits, and modifying the encoded-bit sequence as a modified-encoded-bit sequence with the second data-bit sequence. At a receiver, the method further includes decoding the modified-encoded-bit sequence as a third data-bit sequence, comparing the third data-bit sequence with the predetermined bit pattern, which thereby generates the second data-bit sequence.

Additional objects and advantages of the invention will be set forth in part in the description which follows, and in part will be obvious from the description, or may be learned by practice of the invention. The objects and advantages of the invention also may be realized and obtained by means of the instrumentalities and combinations, particularly pointed out in the appended claims.

BRIEF DESCRIPTION OF THE DRAWINGS

The accompanying drawings, which are incorporated in and constitute a part of this specification, illustrates particular embodiments of the invention, and together with the description service to explain the principles of the invention.

FIG. 3A is an illustrative circuit diagram employing the concepts of the present invention; and FIG. 3B illustrates one embodiment of the bit sequences in FIG. 3A.

DETAILED DESCRIPTION OF THE PREFERRED EMBODIMENTS

Reference will now be made in detail to the present preferred embodiments of the invention, examples of which are illustrated in the accompanying drawings.

The present invention can be used with encoding and decoding apparatus, but is taught herein in a preferred embodiment using an encryptor and decryptor.

Figure 1:
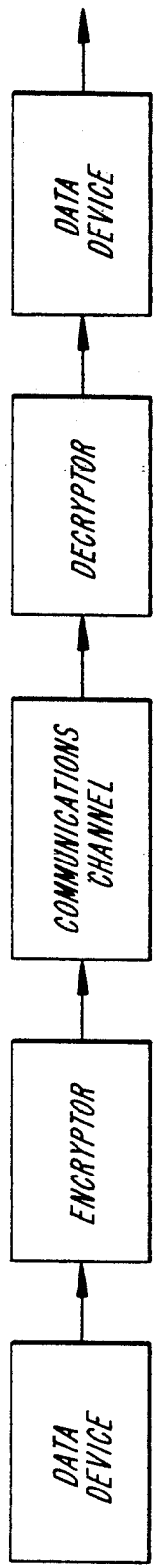
FIG. 1 is a block diagram of a prior art communications channel having a data device with an encryptor and decryptor.
Figure 2:
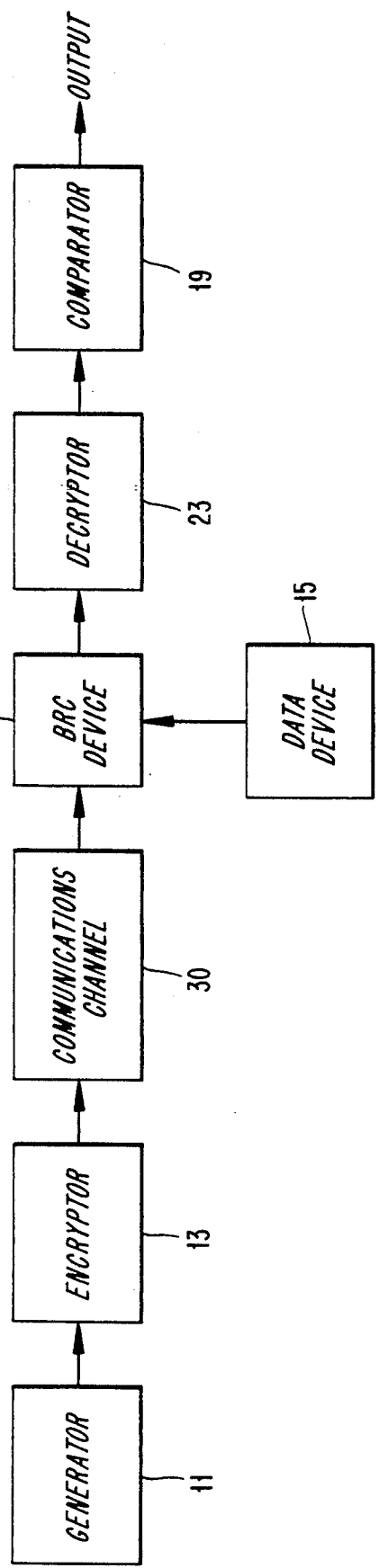
FIG. 2 is a block diagram of the ciphertext and plaintext communications system according to the present invention.

Referring to FIG. 2 a preferred embodiment of a ciphertext to plaintext communications system is provided comprising a communications channel 30, first generating means, encoding means, data generating means, modifying means, decoding means, and comparing means. The first generating means may be embodied as generator 11, the encoding means may be embodied as encryptor 13, the data generating means may be embodied as data device 15, and the modifying means may be embodied as black to red communicator (BRC) device 14. The decoding means may be embodied as decryptor 23, and the comparing means may be embodied as comparator 19.

Encoding means, as used herein, includes any device which encodes or transforms the first data-bit sequence to an encoded bit sequence or equivalent. The equivalent of an encoded bit sequence includes any encoded or encrypted version of the first data-bit sequence employing the concepts taught herein.

Decoding means, as used herein, includes any device which decodes or transforms the framed-encoded-bit sequence or equivalent to the second data-bit sequence. The equivalent of a framed-encoded-bit sequence includes any framed encrypted, transformed, or scrambled version of the first data-bit sequence employing the concepts taught herein.

In a preferred embodiment, as illustrated in FIG. 2, the generator 11 is coupled to the encryptor 13. The encryptor 13 is coupled to the communications channel 30. The BRC device 14 is coupled to the data device 15, and also to the communications channel 30. The decryptor 23 is coupled to the BRC device 14, and the comparator 19 is coupled to the decryptor 23. The communications channel 30 may include channel service units as used on the Tl network or any other device for meeting specifications for communications channel 30.

In the exemplary arrangement shown, the generator 11 generates a first data-bit sequence having a predetermined bit pattern. The predetermined bit pattern may be, for example, a series of 1-bits. The encryptor 13, which is coupled to the generator 11, encrypts the first data-bit sequence as an encrypted-bit sequence. The encryptor 13 sends the encrypted-bit sequence over communications channel 30.

The data device 15 generates a second data-bit sequence comprising a plurality of first and second bits. The second data-bit sequence may be generated, for example, by diagnostic equipment or other equipment located in the communications channel 30 having the encrypted-bit sequence. The first and second bits may be, for example, 1-bits and 0-bits. The BRC device 14, which is coupled to the communications channel 30 and data device 15, modifies the encrypted-bit sequence from the communications channel 30 using the data-bit sequence from data device 15. The BRC device 14 thereby generates a modified encrypted-bit sequence. The modification may include, for example, changing a bit in the encrypted-bit sequence in response to the second data-bit sequence having a 0-bit, and not changing a bit in the encrypted-bit sequence in response to the second data-bit sequence having a 1-bit.

The decryptor 23 decrypts the modified-encrypted-bit sequence from the BRC device 14 as a third data-bit sequence. The comparator 19 compares the third data-bit sequence from the encryptor 23 with a stored replica of the predetermined bit pattern, which thereby generates the second data-bit sequence.

The present invention may have the BRC device 13 located near the encryptor 13, or anywhere in the communications channel 30, or near the decryptor 23.

In operation, the generator 11 generates a first data-bit sequence which has the predetermined bit pattern, which, for example, could be all 1-bits. The encryptor 13 encrypts the first data-bit sequence as an encrypted-bit sequence and for transmission over the communications channel 30. The BRC device 14 which may be located anywhere throughout the communications channel 30, modifies the encrypted-bit sequence using the second data-bit sequence generated by the data device 15.

The decryptor 23 decrypts the modified-encrypted-bit sequence to generate a third data-bit sequence. The third data-bit sequence is then compared by comparator 19 with a stored replica of the predetermined bit pattern. Accordingly, the second data-bit sequence is generated.

The present invention operates having a known predetermined signal, for example, alternating pairs of 0-bits and 1-bits from the generator 11. FIG. 3A illustratively depicts a circuit diagram for the cyphertext to plaintext communications system of the present invention. As shown, a generator 11 generates a predetermined bit pattern which is inputted to encryptor 13 shown as an exclusive OR circuit having an encryption key input. The output of encryptor 13 is cyphertext which is transmitted to BRC device 14 which is embodied as an exclusive OR circuit, having an input connected to a black data input, which is the source of the second data-bit sequence. The output of the BRC device 14 is coupled to a decryptor 23 which is embodied as an exclusive OR circuit having an encryption key input. The output of decryptor 23 is coupled to a comparator 19 which is connected to a generator having the predetermined bit pattern. Accordingly, the red data output is shown. Also shown in FIG. 3A are points A, B, C, D, E, F, G, H and I. At each of these points, the data are illustrated in FIG. 3B, as produced by the present invention.

The present invention also includes a method using a ciphertext to plaintext communications system, having a first data-bit sequence with a predetermined bit pattern. The first data-bit sequence having the predetermined bit pattern is used with an encoded-bit sequence and a second data-bit sequence to communicate the second data-bit sequence to a decryptor to plaintext. The steps comprise generating a first data-bit sequence having a predetermined bit pattern; encoding the first data-bit sequence as an encoded-bit sequence and transmitting the encoded-bit sequence over a communications channel; generating a second data-bit sequence comprising a plurality of first and second bits; modifying the encoded-bit sequence as a modified-encoded-bit sequence using the second data-bit sequence. The steps further include decoding the encoded-bit sequence as a third data-bit sequence; comparing the third data-bit sequence with the predetermined bit pattern; and, generating the second data-bit sequence.

It will be apparent to those skilled in the art that various modifications can be made to the ciphertext to plaintext communications system of the instant invention without departing from the scope or spirit of the invention, and it is intended that the present invention cover modifications and variations of the ciphertext to plaintext communications system provided they come within the scope of the appended claims and their equivalents.

I claim:

1. A ciphertext to plaintext communications system comprising:
   a communications channel;
   first means for generating a first data-bit sequence having a predetermined bit pattern;
   an encryptor coupled to said generating means for encrypting the first data-bit sequence as an encrypted-bit sequence and for transmitting the encrypted-bit sequence over the communications channel;
   second means for generating a second data-bit sequence comprising a plurality of first and second bits;
   means coupled to said second generating means and said communications channel, and responsive to the first bits in the second data-bit sequence for modifying the encrypted-bit sequence as a modified-encrypted-bit sequence;
   a decryptor coupled to said modifying means for decrypting the modified-encrypted-bit sequence as a third data-bit sequence; and
   means coupled to said decryptor for comparing the third data-bit sequence with the predetermined bit pattern, for generating the second data-bit sequence.

2. The ciphertext to plaintext communications system as set forth in claim 1 wherein the predetermined bit pattern includes a data-bit pattern having identical bits.

3. A ciphertext to plaintext communications system comprising:
   first means for generating a first data-bit sequence having a predetermined bit pattern;
   means means for encoding the first data-bit sequence as an encoded-bit sequence;
   second means for generating a second data-bit sequence comprising a plurality of first and second bits;
   means responsive to the first bits in the second data-bit sequence for modifying the encoded-bit sequence as a modified-encoded-bit sequence;
   means for decoding the modified-encoded-bit sequence as a third data-bit sequence; and
   means for comparing the third data-bit sequence with the predetermined bit pattern, for generating the second data-bit sequence.

4. The ciphertext to plaintext communications system as set forth in claim 3 wherein the predetermined bit pattern includes a data-bit pattern having identical bits.

5. The ciphertext to plaintext communications system as set forth in claim 3 wherein said encoding means and said decoding means includes an encryptor and a decryptor, respectively, and the encoded-bit sequence and modified-encoded-bit sequence include an encrypted-bit sequence and modified-encrypted-bit sequence, respectively.

6. The ciphertext to plaintext communications system as set forth in claim 5 wherein the predetermined bit pattern includes a data-bit pattern having identical bits.

7. A ciphertext to plaintext communications system using a first data-bit sequence having a predetermined bit pattern for communicating, on an encoded-bit sequence, and a second data-bit sequence comprising a plurality of first and second bits, comprising:
   means responsive to the first bits in the second data-bit sequence for modifying the encoded-bit sequence as a modified-encoded-bit sequence; and
   means coupled to said modifying means for decoding the modified-encoded-bit sequence as a third data-bit sequence, and for comparing the third data-bit sequence with the predetermined bit pattern, for generating the second data-bit sequence.

8. The ciphertext to plaintext communications system as set forth in claim 7 wherein the predetermined bit pattern includes a data-bit pattern having identical bits.

9. The ciphertext to plaintext communications system as set forth in claim 7 wherein said decoding includes a decryptor, and the encoded-bit sequence and modified-encoded-bit sequence include an encrypted-bit sequence and modified-encrypted-bit sequence, respectively.

10. The ciphertext to plaintext communications system as set forth in claim 9 wherein the predetermined bit pattern includes a data-bit pattern having identical bits.

11. A ciphertext to plaintext communications system using a first data-bit sequence having a predetermined bit pattern for communicating, on an encoded-bit sequence, and a second data-bit sequence comprising a plurality of first and second bits, comprising:
   means responsive to the first bits in the second data-bit sequence for modifying the encoded-bit sequence as a modified-encoded-bit sequence;
   means for transforming the modified-encoded-bit sequence to a third data-bit sequence; and
   means for comparing the third data-bit sequence with the predetermined bit pattern, for generating the second data-bit sequence.

12. The ciphertext to plaintext communications system as set forth in claim 11 wherein the predetermined bit pattern includes a data-bit pattern having identical bits.

13. The ciphertext to plaintext communications system as set forth in claim 11 wherein said transforming means includes a decryptor, and the encoded-bit sequence and modified-encoded-bit sequence include an encrypted-bit sequence and modified-encrypted-bit sequence, respectively.

14. The ciphertext to plaintext communications system as set forth in claim 13 wherein the predetermined bit pattern includes a data-bit pattern having identical bits.

15. A method using a ciphertext to plaintext communications system, a first data-bit sequence having a predetermined bit pattern for communicating, on an encoded-bit sequence, and a second data-bit sequence comprising a plurality of first and second bits, comprising the steps of:

modifying, in response to first bits in the second data-bit sequence, the encoded-bit sequence as a modified-encoded-bit sequence;

transforming the modified-encoded-bit sequence to a third data-bit sequence; and generating the second data-bit sequence by comparing the third data-bit sequence with the predetermined bit pattern.

16. A method using a ciphertext to plaintext communications system comprising the steps of:

generating a first data-bit sequence having a predetermined bit pattern;

encoding the first data-bit sequence as an encoded-bit sequence and for transmitting the encoded-bit sequence over the communications channel;

generating a second data-bit sequence comprising a plurality of first and second bits;

modifying the encoded-bit sequence as a modified-encoded-bit sequence;

decoding the modified-encoded-bit sequence as a third data-bit sequence;

comparing the third data-bit sequence with the predetermined bit pattern; and generating the second data-bit sequence.

17. A method using a ciphertext to plaintext communications system comprising the steps of:

generating a first data-bit sequence having a predetermined bit pattern;

transforming the first data-bit sequence to an encoded-bit sequence;

generating a second data-bit sequence comprising a plurality of first and second bits;

modifying the encoded-bit sequence as a modified-encoded-bit sequence;

transforming the modified-encoded-bit sequence to a third data-bit sequence;

comparing the third data-bit sequence with the predetermined bit pattern; and generating the second data-bit sequence.

18. A method using a ciphertext to plaintext communications system using a first data-bit sequence having a predetermined bit pattern for communicating, on an encrypted-bit sequence, and a second data-bit sequence comprising a plurality of first and second bits, comprising the steps of:

modifying the encrypted-bit sequence as a modified-encrypted-bit sequence;

decrypting the modified-encrypted-bit sequence as a third data-bit sequence;

comparing the third data-bit sequence with the predetermined bit pattern; and generating the second data-bit sequence.

19. A method using a ciphertext to plaintext communications system using a first data-bit sequence having a predetermined bit pattern for communicating, on an encoded-bit sequence, and a second bit sequence comprising a plurality of first and second bits, comprising the steps of:

modifying the encoded-bit sequence as a modified-encoded-bit sequence;

transforming the modified-encoded-bit sequence as a third data-bit sequence;

comparing the third data-bit sequence with the predetermined bit pattern; and generating the second data-bit sequence.

20. A ciphertext to plaintext communications system comprising:

a generator for generating a first data-bit sequence having a predetermined bit pattern;

an encoder for encoding the first data-bit sequence as an encoded-bit sequence;

a data device for generating a second data-bit sequence comprising a plurality of first and second bits;

a BRC device responsive to the first bits in the second data-bit sequence for modifying the encoded-bit sequence as a modified-encoded-bit sequence;

a decoder for decoding the modified-encoded-bit sequence as a third data-bit sequence; and a comparator for comparing the third data-bit sequence with the predetermined bit pattern, for generating the second data-bit sequence.

21. The ciphertext to plaintext communications system as set forth in claim 20 wherein the predetermined bit pattern includes a data-bit pattern having identical bits.

22. The ciphertext to plaintext communications system as set forth in claim 20 wherein said encoder and said decoder include an encryptor and a decryptor, respectively, and the encoded-bit sequence and modified-encoded-bit sequence include an encrypted-bit sequence and modified-encrypted-bit sequence, respectively.

23. The ciphertext to plaintext communications system as set forth in claim 22 wherein the predetermined bit pattern includes a data-bit pattern having identical bits.

24. A ciphertext to plaintext communications system using a first data-bit sequence having a predetermined bit pattern for communicating, on an encoded-bit sequence, and a second data-bit sequence comprising a plurality of first and second bits, comprising:

a BRC device responsive to the first bits in the second data-bit sequence for modifying the encoded-bit sequence as a modified-encoded-bit sequence; and a decoder coupled to said modifying means for decoding the modified-encoded-bit sequence as a third data-bit sequence, and for comparing the third data-bit sequence with the predetermined bit pattern, for generating the second data-bit sequence.

25. The ciphertext to plaintext communications system as set forth in claim 24 wherein the predetermined bit pattern includes a data-bit pattern having identical bits.

26. The ciphertext to plaintext communications system as set forth in claim 24 wherein said decoder includes a decryptor, and the encoded-bit sequence and modified-encoded-bit sequence include an encrypted-bit sequence and modified-encrypted-bit sequence, respectively.

27. The ciphertext to plaintext communications system as set forth in claim 26 wherein the predetermined bit pattern includes a data-bit pattern having identical bits.

28. A ciphertext to plaintext communications system using a first data-bit sequence having a predetermined bit pattern for communicating, on an encoded-bit sequence, and a second data-bit sequence comprising a plurality of first and second bits, comprising:

a BRC device responsive to the first bits in the second data-bit sequence for modifying the encoded-bit sequence as a modified-encoded-bit sequence;

a decoder for transforming the modified-encoded-bit sequence to a third data-bit sequence; and a comparator for comparing the third data-bit sequence with the predetermined bit pattern, for generating the second data-bit sequence.

29. The ciphertext to plaintext communications system as set forth in claim 28 wherein the predetermined bit pattern includes a data-bit pattern having identical bits.

30. The ciphertext to plaintext communications system as set forth in claim 28 wherein said decoder includes a decryptor, and the encoded-bit sequence and modified-encoded-bit sequence include an encrypted-bit sequence and modified-encrypted-bit sequence, respectively.

31. The ciphertext to plaintext communications system as set forth in claim 30 wherein the predetermined bit pattern includes a data-bit pattern having identical bits.

* * * * *